(12) United States Patent
Mittal et al.

(10) Patent No.: US 11,340,514 B2
(45) Date of Patent: May 24, 2022

(54) TUNABLE ROBUST TOPOLOGICAL SOURCE OF INDISTINGUISHABLE CORRELATED PHOTON PAIRS

(71) Applicant: University of Maryland, College Park, College Park, MD (US)

(72) Inventors: Sunil Mittal, Rockville, MD (US); Mohammad Hafezi, Washington, DC (US); Venkata Vikram Orre, College Park, MD (US); Elizabeth Goldschmidt, Urbana, IL (US)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 0 days.

(21) Appl. No.: 17/326,971

(22) Filed: May 21, 2021

(65) Prior Publication Data

US 2022/0075237 A1    Mar. 10, 2022

Related U.S. Application Data

(60) Provisional application No. 63/028,468, filed on May 21, 2020.

(51) Int. Cl.
*G02F 1/35*        (2006.01)
*G02F 1/365*      (2006.01)

(52) U.S. Cl.
CPC .......... *G02F 1/3526* (2013.01); *G02F 1/3536* (2013.01); *G02F 1/365* (2013.01)

(58) Field of Classification Search
CPC .................................................... G02F 1/3526
See application file for complete search history.

(56) References Cited

U.S. PATENT DOCUMENTS 9,052,448 B2 *   6/2015   Hafezi ................... H04J 14/02
10,725,131 B2 *  7/2020   Clerk ...................... H03F 3/213

OTHER PUBLICATIONS

Barik et al., A Topological Quantum Optics Interface, Science, 2018, 359(6376):666-668.
Eisaman et al., Invited Review Article: Single-Photon Sources and Detectors, Review of Scientific Instruments, 2011, 82:071101, pp. 1-25.
Franson, Bell Inequality for Position and Time, Physical Review Letters, 1989, 62(19):2205-2208.

(Continued)

*Primary Examiner* — Rhonda S Peace
(74) *Attorney, Agent, or Firm* — Quarles & Brady LLP; Yakov Sidorin (57) ABSTRACT

A topological photonic system configured as a robust source of indistinguishable photons pairs with tunable spectral correlations. The system includes a two-dimensional silicon-photonic ring resonator array configured to implement an anomalous-quantum Hall model that exhibits topologically robust edge states. Linear dispersion of the edge states ensures efficient and robust phase matching and tunability of the spectral bandwidth of photon pairs generated via spontaneous four-wave mixing. Spectral tunability is manifested in the temporal correlations in the Hong-Ou-Mandel interference between photons. The generated photon pairs are energy-time entangled.

20 Claims, 8 Drawing Sheets

(56) References Cited

OTHER PUBLICATIONS

Hong et al., Measurement of Subpicosecond Time Intervals Between Two Photons by Interference, Physical Review Letters, 1987, 59(18):2044-2046.
Mittal et al., Temporal and Spectral Manipulations of Correlated Photons Using a Time Lens, Physical Review A, 2017, 96(4):043807, pp. 1-8.
Mittal et al., A Topological Source of Quantum Light, Nature, 2018, 561(7724):502-506.
Mittal et al., Photonic Anomalous Quantum Hall Effect, Physical Review Letters, 2019, 123(4):043201, 6 pages.
Tambasco et al., Quantum Interference of Topological States of Light, Science Advances, 2018,4(9):eaat3187, pp. 1-5.

* cited by examiner

TUNABLE ROBUST TOPOLOGICAL SOURCE OF INDISTINGUISHABLE CORRELATED PHOTON PAIRS

CROSS REFERENCE TO RELATED APPLICATIONS

This application claims the priority from and benefit of the U.S. Provisional Patent Application No. 63/028,468 filed on May 21, 2020, the entire contents of which are incorporated by reference herein, for all purposes.

STATEMENT REGARDING FEDERALLY SPONSORED RESEARCH OR DEVELOPMENT

This invention was made with government support under PHY1430094 and PHY1820938 awarded by the National Science Foundation (NSF); N000141512727 and N000142012325 awarded by the Office of Naval Research (ONR); FA95501610323 awarded by the Air Force Office of Scientific Research (AFOSR); and W911NF1920181 awarded by Army Research Laboratory (ARL). The government has certain rights in the invention.

TECHNICAL FIELD

The present invention generally relates to sources of quantum light and, more particularly, to topological sources of quantum light that facilitate spectral tunability of the generated quantum light output as a result of having a substantially uniform spectral edge band and that, at the same time, remain robust against the fabrication disorders.

RELATED ART

Photonic quantum information protocols invariably require sources of quantum light, for example, photon pairs that are correlated or entangled in various degrees of freedom, as well as control over these correlations. The most commonly used sources of correlated photon pairs rely on spontaneous parametric nonlinear processes such as down-conversion (SPDC) and four-wave mixing (SFWM) that naturally lead to the emergence of spectral and temporal correlations in generated photons (see, for example, Franson J. D., in Phys. Rev. Lett., 62, 2205-2208 (1989); Eisaman et al., in Review of Sci. Instr., 82, 071101, 2011). These quantum correlations dictate the characteristics of quantum interference between photons and, ultimately, their applications in quantum technologies. In particular, Hong-Ou-Mandel (HOM) interference, which is the basis of many protocols used in quantum communications, photonic quantum simulations using quantum-walks, and boson sampling schemes, requires indistinguishable photon pairs with spectral correlations that are symmetric under exchange of photons. In addition, there exists a growing need to engineer the spectral bandwidth of generated indistinguishable photon pairs so as to efficiently interface them with quantum emitters or quantum memories in a quantum network (see, for example, Mittal S. et al., in Phys Rev. A, 96, 043807, 2017). Nanophotonic systems, such as ring resonators, provide a scalable and versatile platform for the generation of indistinguishable photon pairs via SPDC or SFWM. While nanophotonic ring resonators have been shown to provide for generation of indistinguishable photon pairs with spectral and temporal correlations, such demonstrated nanophotonic systems are recognized in related art not allowing for tunability of the spectral and temporal correlations between generated photon pairs, and as being prone to fabrication disorders that lead to random variations in photonic mode structure, and subsequently, randomness in the spectral-temporal correlations between generated photons.

Recently, the idea of utilization of topological system arose in connection with the idea of overcoming the dependency of photonic devices on fabrication disorders. In particular, topological photonic devices have been demonstrated in use as robust optical delay lines, lasers, optical fibers, and reconfigurable pathways on chips. Topological robustness has also been attempted in quantum photonic systems and led to the development of topological sources of quantum light with robust spectral or spatial correlations (Mittal S. et al., in Nature 561, 502, 2018), chiral quantum-optic interfaces between quantum dots and photonic crystals (Barik s. et al., in Science, 359, 666-668, 2018), and topological beam-splitters for quantum interference of photons (Tambasco J.-L., et al., in Science Advances, 4, 2018). One of the needs of related art—the generation of indistinguishable photon pairs with tunable and robust spectra-temporal correlations—remains an outstanding challenge.

SUMMARY OF THE INVENTION

Embodiments of the present invention realize tunable and robust generation of indistinguishable photon pairs via dual-pump SFWM in a topological photonic system utilizing ring resonators and simulating the anomalous-quantum Hall effect for photons (Mittal s. et al., in Phys. Rev. Lett. 123, 043201, 2019). Such topological system is judiciously structured to ensure the linear dispersion and the spatial confinement of the topological edge states to be able to achieve efficient phase-matching throughout the edge band of the transmission spectrum and thereby enhance the generation of photon pairs and to simultaneously tune the spectral bandwidth of photon pairs by tuning the two pump frequencies. The robust mode structure of the created topological edge states leads to robustness of the spectral correlations between generated photons. The demonstrated system is time-reversal symmetric and supports two pseudo-spins corresponding to the two circulation directions in the ring resonators. As is discussed below in detail, and similar to the quantum spin-Hall effect, the edge states associated with the two pseudo-spins circulate around the lattice in opposite directions. These two counter-propagating edge states, together with a Sagnac interferometer scheme complementing the combination of ring resonators, were used to generate path-entangled photon pairs, and subsequently, realize a deterministic quantum beam-splitter to separate the indistinguishable photon pairs via time-reversed Hong-Ou-Mandel (HOM) interference, and finally, to confirm the indistinguishability of signal and idler photons from such a pair via HOM interference experiment. The tunability of the spectral bandwidth of the two-photon wavefunction was shown to manifest in the temporal width of the HOM interference dip. The generated photon pairs were shown to be energy-time entangled. The robustness of their spectral correlations was confirmed using numerical simulations.

An embodiment of the present invention provides a source of quantum light that includes a multidimensional array of ring resonators (such array is built from site and link ring resonators, and in each column and each row of the array, the site and link ring resonators alternate with one another) that has at least one input port and at least one output port. The array is characterized by a multi-free spectral range (FSR) transmission spectrum that, in each of the FSRs, includes (i) at least one transmission edge band that is substantially spectrally uniform and characterized by a substantially linear dispersion and (ii) first and second transmission bulk bands sandwiching the at least one transmission edge band. The source of light additionally includes an optical pump system that contains first and second lasers optically coupled into the at least one input port, and is configured to produce (at the at least one output port) a light output that is spectrally tunable within the at least one transmission edge bands and that contains a pair of indistinguishable correlated photons. In at least one implementation, the source of light is configured to produce a synthetic magnetic field for photons propagating through the multidimensional array and/or to produce the light output with the use of a third-order nonlinear process. In at least one embodiment, the array is dimensioned to have an irregular shape and, in such a case, the array may include at least one outer peripheral region circumscribing a portion of the array and/or at least one inner peripheral region circumscribed by such at least one outer peripheral region (here, the at least one outer peripheral region and/or the at least one inner peripheral region is configured as a closed-loop waveguide containing the site and link ring resonators disposed at at least one boundary of the array, and the source of quantum light is configured to maintain the propagation of light only along such at least one outer peripheral region and/or such at least one inner peripheral region when a spectral frequency of said light is within the at least one transmission edge band). Alternatively or in addition, when the array has an irregular shape and in operation of the source of quantum light, a portion of the array circumscribed by the at least one outer peripheral region or located between the at least one outer peripheral region and the at least one inner peripheral region is substantially devoid of light (that is, does not support the propagation of light) that has a frequency within the at least one transmission edge band. Alternatively or in addition, and when the array contains multiple input ports, such multiple input ports are located to excite light (propagating via the array towards the at least one output port) in different modes that propagate through the at least one outer peripheral region and/or the at least one inner peripheral region depending on whether pump light from the optical pump system is coupled into one or more of such multiple input ports. In substantially any embodiment, the source of light may be configured such that multiple transmission edge bands are present. Alternatively or in addition—and in practically every embodiment—a first resonant frequency of the site ring resonators may be chosen to be different from a second resonant frequency of the link ring resonators and/or an optical path length of each of the link ring resonators may be defined to be different from an optical length of each of the site ring resonators by substantially an odd multiple of one half of an operating wavelength. In at least one case, each link ring resonator is dimensioned to transmit light (from a first site resonator to a second site resonator that are sandwiching said link resonator) while introducing a phase change to the light, with a value of such phase change being dependent on a direction of propagation of light through the array. Alternatively or in addition, and in substantially every embodiment, the source of light may be structured to maintain the propagation of light only along the peripheral region of the array when a spectral frequency of said light is within the transmission edge band (the peripheral region of the array is chosen to circumscribe a central region of the array and is configured as a closed-loop waveguide formed by the site and link resonators disposed at least in first and last columns of the array and at least in first and last rows of the array). In this latter case, in operation of the source of light, the central region of the array is substantially devoid of light having the spectral frequency within the transmission edge band. Alternatively or in addition, the source of light may be configured such that light, propagating through the array to form the light output, includes first and second counter-propagating edge modes of light when a frequency of such light is within the transmission edge band and/or (when there are first and second input ports) be configured such that either the first or the second of the counter-propagating edge modes is selected for propagation based on whether pump light from the first and second lasers is coupled into the first input port or the second input port. Alternatively or in addition, and in substantially every implementation, the source of light may be configured such that light (propagating in operation of the source through the array to form the light output) includes first and second counter-propagating edge modes of light when a frequency of said light is within the transmission edge band, and such first and second counter-propagating edge modes are substantially confined within the peripheral region of the array.

Embodiments of the invention additionally provide a method that includes the steps of receiving (at at least one input port of a multidimensional array of ring resonators) pump light from the first and second laser pump systems and producing, at at least one output port of such array, a light output by at least circulating light energy of the pump light around a peripheral region of the array. Here, the array includes a multiplicity of site and link ring resonators and in each column and each row of the array, the site and link ring resonators alternate with one another. The array is characterized by a multi-FSR transmission spectrum that, in each of the FSRs, includes at least one transmission edge band (which is substantially spectrally uniform) and first and second side transmission bulk bands sandwiching such transmission edge band. Moreover, in the process of producing the light output such light output is spectrally-tunable within at least one transmission edge band present, and contains a pair of indistinguishable correlated photons. Optionally, the step of circulating light energy includes maintaining propagation of such light energy along the peripheral region of the array only when a spectral frequency of pump light is within the at least one transmission edge band. (In this latter case, the process of propagating light through the array does not include or involve (that is, is devoid of) propagating of the pump light through the central region when the spectral frequency of the pump light is within the at least one transmission edge band. Alternatively or in addition, the method may also include a step of changing a phase of light propagating through the array when transmitting such light from a chosen site ring resonator through a neighboring link ring resonator to an adjoining site ring resonator, with a value of a change of the phase of light being dependent on a direction of propagation of the light through the array. In at least one implementation, the step of circulating light energy may include circulating said light energy from the pump light through a sequence of ring resonators that have different optical lengths and/or the method may include a process of transformation of light with the use of a third order nonlinear process. Alternatively or in addition, the method may additionally include a step of increasing an intensity of the produced pair of photons by substantially matching a frequency of the pump light from the first laser system to a frequency of the pump light from the second laser system and/or to include a step of forming the pair of indistinguishable correlated photons that are energy-time entangled. In particular, the formation of the pair of indistinguishable photons may produce a pair such photons having a spectrum that is robust against a defect or variation in at least one of a resonant frequency of a chosen ring resonator and a position of said chosen ring resonator in the array.

BRIEF DESCRIPTION OF THE DRAWINGS

The invention will be more fully understood by referring to the following Detailed Description of Specific Embodiments in conjunction with the Drawings, of which:

FIGS. 1B and 1C illustrate the simulated transmission and delay multi-free-spectral-range (FSR) spectra of the device of FIG. 1A showing edge and bulk transmission bands. The spectra repeat in every FSR. To generate indistinguishable photon pairs via dual-pump SFWM, the lattice is pumped using two continuous-wave lasers, in different FSRs centered at $\omega_{0p1}$ and $\omega_{0p2}$ (as shown in inset above FIG. 1B). At the output of the array of ring resonators, tunable filters, superconducting nanowire detectors (SNSPDs), and a time-interval analyzer were used to form a coincidence detection setup to reveal generated photon pairs in the FSR centered at $\omega_{s,i}$ via time-resolved correlation measurements. This coincidence detection setup allowed for exclusion of frequency non-degenerate photons created by the single pump SFWM (see inset above FIG. 1B). EDFA: erbium-doped fiber amplifier; PC: polarization controller; TCSPC: time-correlated single photon counter.

FIGS. 4D, 4E are histograms showing coincidences measured at two specific points I, II indicated in FIG. 4B. The histograms illustrate the maximum and the minimum coincidence counts in the central peak. The counts in the side peaks are substantially constant. The error bars are calculated assuming Poisson statistics. The input pump frequencies in this experiment were chosen to be $\delta\omega_{p1} \approx 0.8$ J$\approx \delta\omega_{p2}$.

Generally, the sizes and relative scales of elements in Drawings may be set to be different from actual ones to appropriately facilitate simplicity, clarity, and understanding of the Drawings. For the same reason, not all elements present in one Drawing may necessarily be shown in another.

DETAILED DESCRIPTION

In accordance with preferred embodiments of the present invention, method and apparatus are disclosed for generation of pair of indistinguishable photons.

Specifically, the inability of related art to provide a spectrally-tunable and robust source of indistinguishable photon pairs is solved by devising a topological photonic system that includes a judiciously-structured multidimensional array or lattice of mutually-coupled ring resonators of different types, the first of which—being interdigitated with the second type resonators—is configured to ensure that the multi-free-spectral-range transmission band of the array includes, in a given free-spectral range (FSR), at last one transmission region referred to as an edge band (in which the transmission spectrum is substantially uniform and which is characterized by a substantially linear dispersion, flat delay), and at least two supplemental regions (bulk bands) that neighbor such edge band on either side and sandwich this edge band therebetween.

the edge states of light propagating through the device and their linear dispersion remains robust against any defects in the lattice of the device, and when pumped with a laser light at the frequency corresponding to the edge band of the array, the array of ring resonators supports the propagation of light only around the peripheral portion (edge portion) of the array, while substantially no propagation of light at such frequency occurs in a central portion of the array.

It is appreciated that a ring optical resonator is defined by an optical resonator an optical path through which is configured as a closed loop (and, in specific cases, having shapes substantially similar to a circle or ellipse or a polygon—a hexagon, for example). In devising such a photonic system, the constituent ring resonators of the source were in one specific case fabricated using a material that exhibited third order optical nonlinearity (such as silicon, silicon nitride, or aluminum nitride), and thereby, allowed for generation of photons via spontaneous four-wave mixing process. (In a related embodiment, the second order nonlinear process—such as, for example, spontaneous parametric down conversion—could be used to achieve the same goal.) When pumped with two laser beams (having respective frequencies corresponding to the edge bands of the array in two different FSRs, the disclosed photonic system generated indistinguishable photons (via SFWM) only along the periphery of the array, with frequencies of so-generated photons lying also in the edge band of another FSR of the array. The generation rate of photon pairs was increased when the pump laser frequencies were in the transmission edge band, due to the linear dispersion of the edge band which resulted in efficient momentum (phase) matching condition. The substantially uniform transmission spectrum and the linear dispersion of the edge band allowed spectral-tunability of the embodiment of the light source without significantly affecting the intensity of the generated light output.

As used in this disclosure and the appended claims—and unless specifically defined otherwise—the two photons of light are considered and defined to be indistinguishable when they possess no characteristic that can tell them apart. The two photons of light are considered to be correlated when they possess intensity correlations (that is, the presence of one photon heralds the simultaneous presence of the other). The two photons of light are defined to be energy-time entangled when their frequencies/energies are correlated (in that a measurement of one photon's frequency reveals the frequency of the other photon). The source of light is defined to be topological if and when the properties of light generated by such source depend on the global properties and symmetries of the source, and the source exhibits topological edge states. A given photonic device (for example, a source of quantum light) is considered to be robust when a fabrication disorder or defect in the structure of such device substantially does not affect the structure of mode of light supported by such device, which results—at least in the case of the robust source of light—in practical preservation of the spectral-temporal correlations between the photons generated by such source. (Phrased differently, when the structure of the source of photons is robust, the spectral-temporal correlations between the generated photons does not turn random if a defect to such structure is introduced.)

Examples of Experimental Setup and Process of Generation of Target Photon Pair

Figure 1A:
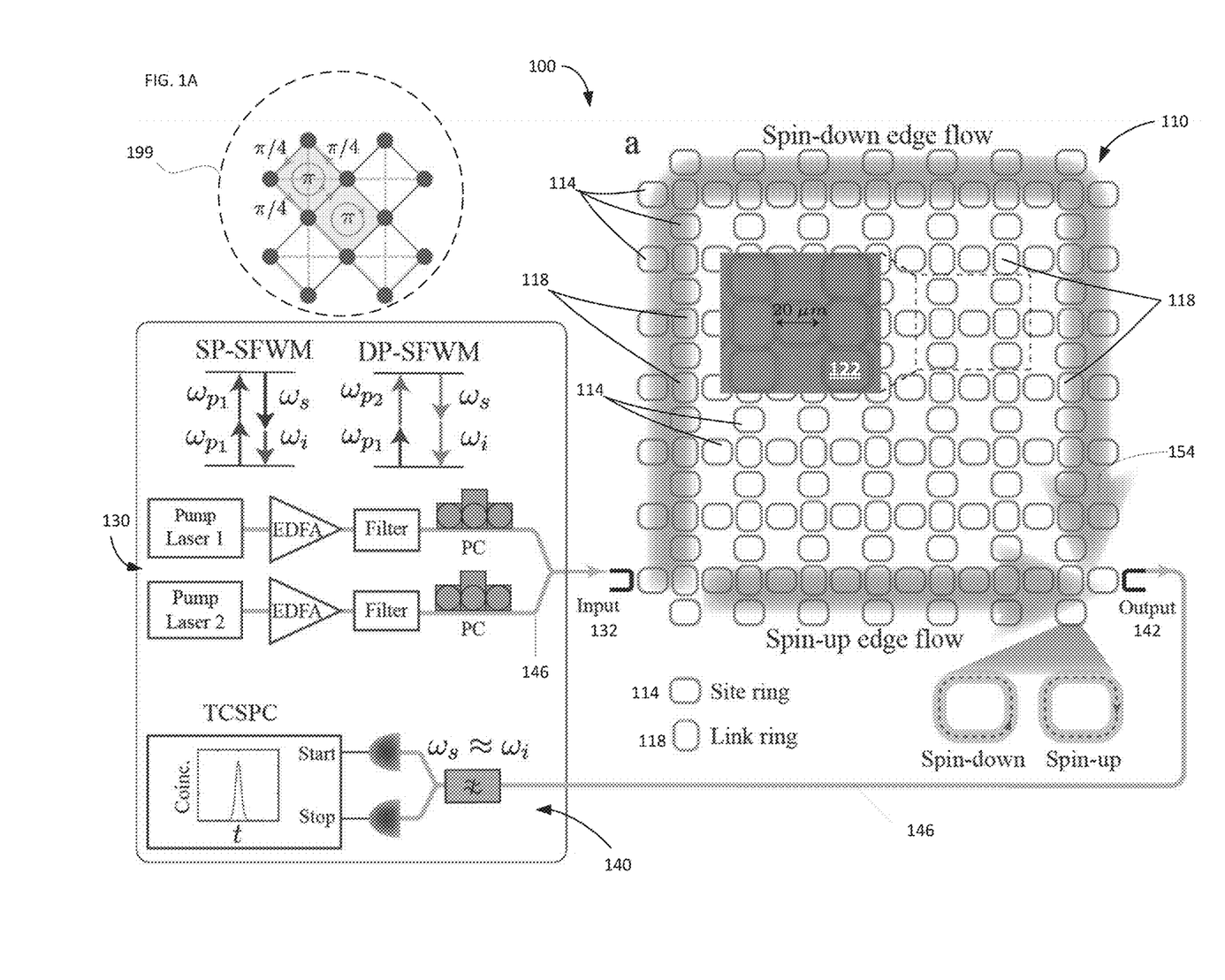
FIG. 1A is a schematic of an embodiment of the device of the invention configured as a source of quantum light and including the multidimensional array of silicon ring resonators that simulates the anomalous quantum-hall effect for photons. The link rings couple nearest and next-nearest neighbor site rings, with hopping phases of $+/-\pi/4$, as shown in the inset 199. The lattice supports two pseudospins (up and down), with corresponding edge states travelling in opposite directions.

As is schematically illustrated in FIG. 1A, the source of light 100 includes a multidimensional (shown in this case as a two-dimension, or 2D) checkerboard lattice or array 110 of ring resonators 114, 118. The ring resonators 114 (shown a bit elongated along the horizontal axis of FIG. 1A) at the lattice sites are referred to as site ring resonators or rings and are coupled to their nearest and next-nearest neighbors using another set of ring resonators 118 (shown a bit elongated along the vertical axis of the Figure), which are referred to as the link rings. The spatial gap(s) between the link and the site rings 118, 114 sets the strength of the evanescent field coupling between the site rings 114 and is chosen in this example to be substantially the same for both the nearest and next-nearest neighbor site rings. The resonance frequencies of the link rings 118 are judiciously detuned from those of the site rings 114 such that the link rings 118 act as light waveguides operably connecting site rings 118. More importantly, depending on their position, the link rings 118 introduce a direction-dependent hopping phase between the site rings 114. In the example 100, the link rings 118 are positioned such that the hopping phase between next-nearest neighbor site rings 114 is always zero, while that between nearest neighbor site rings 114 is $+/-\pi/4$. This configuration effectively leads to the realization of a staggered synthetic magnetic field for photons such that the average magnetic flux through a unit cell of two plaquettes (shown as a shaded area 122) of the lattice 110 is zero, but the flux through a single plaquette is non-zero.

A pump laser system 130 is operably coupled to the input port 132 of the array 110, while the coincidence detection electronic circuitry 140 is disposed at the output port 142 of the array 110 to receive the light output formed by the so-pumped array 110. A related embodiment of the device can also contain multiple input and multiple output ports.

The so-structured coupled ring resonator configuration 110 simulates the anomalous quantum Hall effect for photons (see Mittal 2019), with a Haldane-like tight-binding Hamiltonian $$H = \sum_m \omega_0 a_m^\dagger a_m - J\left(\sum_{\langle m,n \rangle} a_n^\dagger a_m e^{-i\phi_{m,n}} + \sum_{\langle\langle m,n \rangle\rangle} a_n^\dagger a_m + h.c.\right)$$

Here $a_m^\dagger (a_m)$ is the creation (annihilation) operator at a lattice site m=(x, y). The summations $\langle m, n \rangle$ and $\langle\langle m, n \rangle\rangle$ are over the nearest and the next-nearest neighbor lattice sites, respectively. J is the coupling strength between the lattice sites, and is the same for both nearest and next nearest neighbors. The hopping phase is $\phi_{m,n} = +\pi/4$ for nearest-neighbor site rings 114 couplings and is zero for next-nearest neighbor couplings. The energy-momentum band structure of the lattice exhibits, in each of the multiple FSRs, two bulk bands separated by a bandgap. For a finite lattice 110, the band gap hosts topological edge states that are confined to the boundary of the lattice 110. (One can consider the array 110 to include a central region and a peripheral or boundary region circumscribing the central region, where such peripheral region is configured as a closed-loop waveguide formed by the site and link ring resonators that are disposed at least in first and last columns of the array 110 and at least in first and last rows of the array 110. It is to this peripheral or boundary region that the propagation of light in the array 110 is confined when a spectral frequency of such light is within the transmission edge band.) Furthermore, the edge states are robust against disorders, such as, a mismatch in the ring resonance frequencies. Moreover, they exhibit a linear dispersion.

Figure 1B:
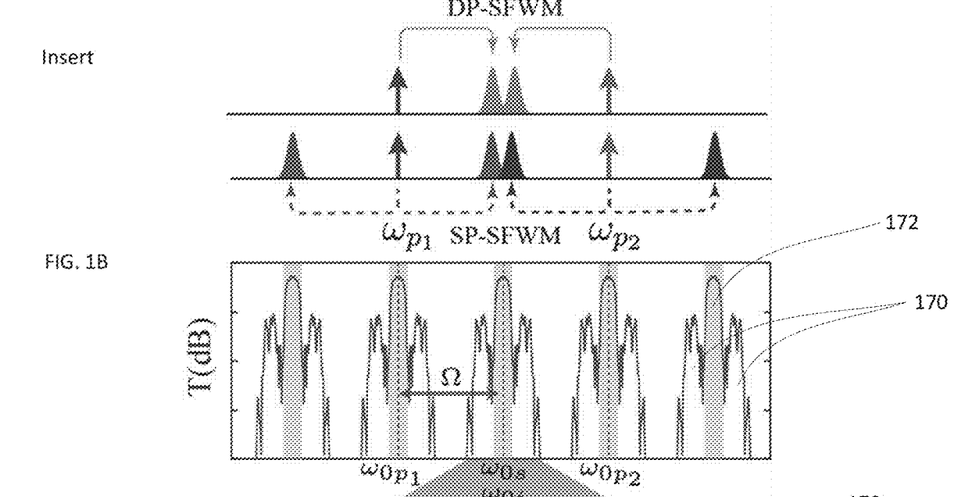
Figure 1C:
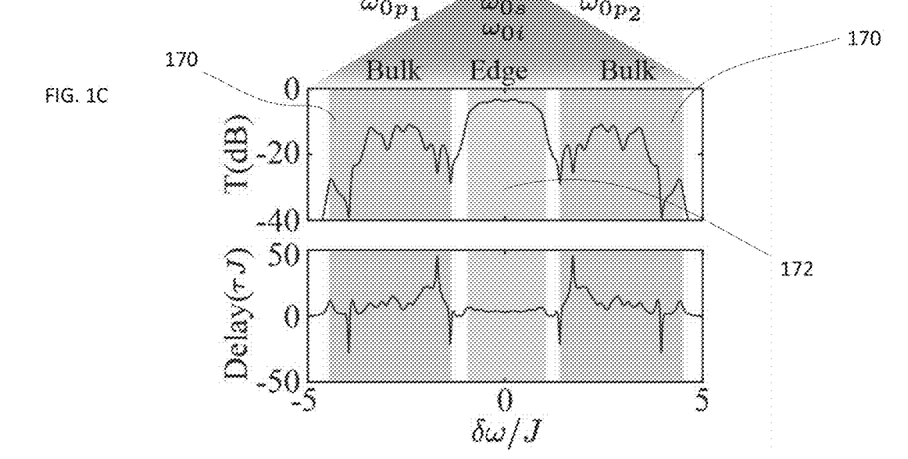

The simulated transmission and delay spectra for an 8×8 version of the array 110 are shown in FIGS. 1B, 1C. The energy-momentum band structure of the lattice exhibits, in each of the multiple FSRs, two bulk bands 170 separated by a transmission edge band 172. The band structure of the lattice 110 and the presence of edge states can be verified by measuring the transmission and the delay spectra of the lattice from input to the output port. The linear dispersion of the edge states manifests in the Wigner delay spectrum as a flat profile of the graph of FIG. 1C in the transmission edge band 172 in the range $\delta\omega=[-1,1]$ J, where $\delta\omega=\omega-\omega_0$ is the detuning of the excitation laser frequency, w, from the ring resonance frequency, $\omega_0$, for a given longitudinal mode. In contrast, the Wigner delay in the bulk band varies significantly because in a finite lattice, the bulk bands do not have a well-defined momentum. One can consider the array 110 to include a central region and a peripheral or boundary region circumscribing the central region, where such peripheral region is configured as a closed-loop waveguide formed by the site and link ring resonators that are disposed at least in first and last columns of the array 110 and at least in first and last rows of the array 110. It is to this peripheral or boundary region that the propagation of light in the edge states (that is, with a spectral frequency of such light is within the transmission edge band 172), is confined as is schematically illustrated with an arrow 154 in FIG. 1A.

The system 100 also supported a pseudospin degree of freedom because of the two circulation directions (clockwise and counter-clockwise, see arrow 154) in the array 110 of the ring resonators 114, 118. The two pseudospins (up and down) are time-reversed partners, and therefore, experience opposite hopping phases and exhibit counter propagating edge states.

Figure 2A:
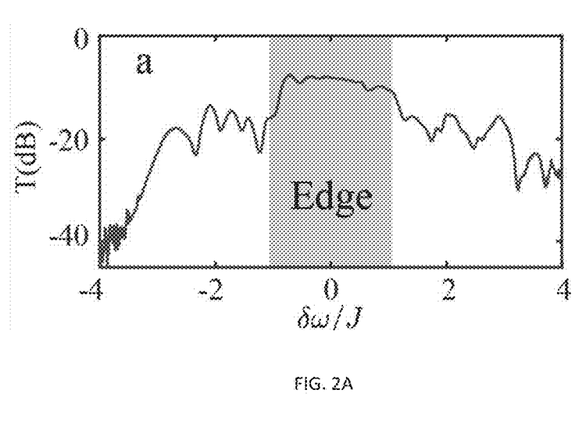
FIG. 2A is an empirically acquired transmission spectrum of an anomalous Hall device of FIG. 1A, with the edge band highlighted.

The 8×8 device 110 was fabricated using the CMOS compatible silicon-on-insulator (SOI) platform at a commercial foundry (IMEC Belgium). The ring waveguides of the resonators 14, 118 were about 510 nm wide, about 220 nm high, and—at telecom wavelengths of about 1550 nm—supported a single TE-polarized mode. The ring length was about 70 microns with an FSR of about 1 THz. The coupling gap between the rings was about 0.180 nm, which resulted in a coupling strength J of about (27015.6 GHz. The lattice 110 was coupled to input and output waveguides (ports 132, 142). At the ends of the input/output waveguides 132, 142, grating couplers were used (not shown) to inject light from a standard single-mode fiber 146 into the waveguides 132, 142. FIG. 2A illustrates the experimentally measured transmission spectrum of the device for the spin-up excitation, with the edge band highlighted (compare with the edge transmission band 172 of FIG. 1B). The edge states for this excitation take the shorter (counterclock-wise) route from input port 132 to the output coupler 142, as shown in FIG. 1A.

To generate target indistinguishable photon pairs in this lattice, the $\chi^{(3)}$ nonlinearity of silicon and a dual-pump (DP) four-wave mixing (SFWM) process were employed. To this end, as was already alluded to, the lattice 110 was pumped with two classical, continuous-wave pump laser beams (see sub-system 130 of FIG. 1A) at frequencies $\omega_{p1}$, $\omega_{p2}$, respectively. The DP-SFWM type pumping led to the generation of indistinguishable photon pairs (referred to as signal and idler), at frequencies $\omega_S$, $\omega_i$ respectively, such that the energy conservation relation $$\omega_{p1}+\omega_{p2}=\omega_S+\omega_i$$

was satisfied. The pump frequencies are in fact positioned in two different longitudinal modes of the lattice separated by two FSRs (as shown in Inset to FIG. 1B). The indistinguishable photon pairs are then generated in the longitudinal mode located midway between the two pump modes, that is, $\omega_{0p1}+\omega_{0p2}=\omega_{0S}+\omega_{0i}$ and $\omega_{0S}=\omega_i$. Here, $\omega_{0k}$ (with k=p1, p2, s, i), is the resonance frequency of the respective longitudinal mode. Such nonlinear process is described by the Hamiltonian $$H_{nonlinear} = \eta \sum_m \left( a_{m,s}^\dagger a_{m,i}^\dagger a_{m,p_1} a_{m,p_2} + a_{m,p_1}^\dagger a_{m,p_2}^\dagger a_{m,s} a_{m,i} \right)$$

where η is the efficiency of the SFWM process, and $a_{m,\mu}^\dagger$, with μ=s, i, $p_1$, $p_2$ is the photon creation operator for signal, idler, or pump photons, respectively, at a lattice site m. The DP-SFWM adds or removes photons in pairs, and therefore, in the low-loss regime, leads to single-mode squeezed light. Each of the two pump beams of the sub-system 130 also generates distinguishable photon pairs via non-degenerate (single pump) SFWM (SP-SFWM). However, because of the energy conservation, these photon pairs are generated in longitudinal modes located symmetrically around the respective pump beams (see Inset to FIG. 1B). Therefore, spectral filtering and time-resolved coincidence measurement circuitry 140 was additionally employed to exclude the noise photons generated by single pump SFWM.

Having the benefit of this disclosure, a skilled artisan will now readily appreciate that embodiments of the invention provide a source of light that includes a multidimensional array of ring resonators including a multiplicity of the first and second ring resonators, an input port, and an output port. Here, in each column and each row of the array, the first and second ring resonators alternate with one another. The array of ring resonators having a multi-FSR transmission spectrum that, in each of the FSRs, includes a central (edge) transmission band that is substantially spectrally uniform and first and second side (bulk) transmission bands neighbouring and sandwiching the central (edge) transmission band. The source additionally includes an optical pump system containing first and second lasers optically coupled into the input port. The source of light is configured to produce, at the output port, a light output that is spectrally tunable within the central transmission band and that contains a pair of indistinguishable photons. A method of operating such source of light includes receiving, at the input port of such multidimensional array of ring resonators, pump light from the first and second lasers and producing at the output port a light output that is tunable within the transmission edge band and that contains a pair of indistinguishable photons—by at least circulating light energy of the pump light around the peripheral region of the array.

Properties of Generated Photon Pair: Spectral Correlation, Tunability, Indistinguishability, and Energy-Time Entanglement.

Figure 2B:
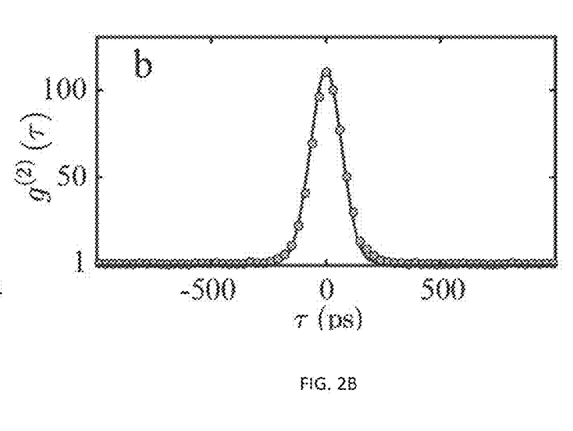
FIG. 2B is a measured second-order temporal correlation function $g_2(\tau)$, showing that the photons generated at the output of the device of FIG. 1A are strongly correlated.
Figure 2C:
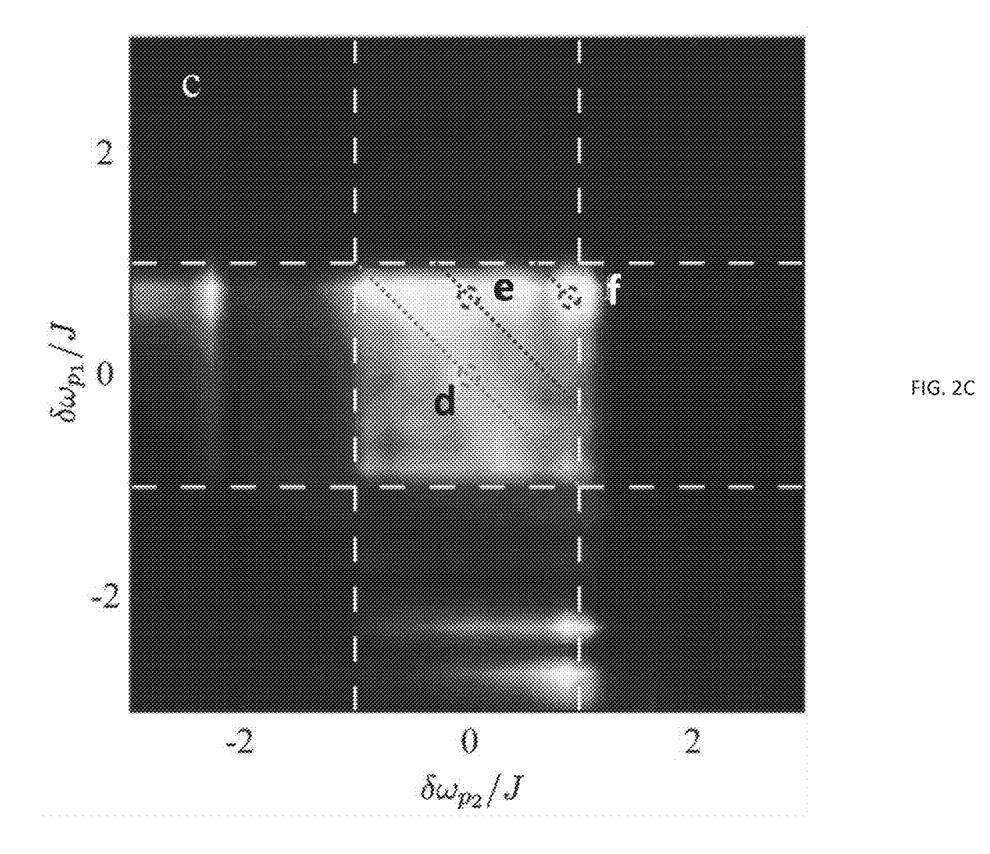
FIG. 2C is a plot of measured coincidence counts as a function of the input pump frequency detunings $\delta\omega_{p1}$, $\delta\omega_{p2}$ relative to the respective longitudinal resonances.

To understand the nature of spectral correlations between the two pump fields and the generated photons, a measurement was made of the number of indistinguishable photon pairs generated via DP-SFWM as a function of the two pump frequency detunings ($\delta\omega_{p1,2}=\omega_{p1,2}-\omega_{0p1,2}$), relative to their respective longitudinal mode center frequencies. As mentioned earlier, time-resolved correlation measurements—see sub-system 140 of FIG. 1A—was used to post-select the photon pairs generated by DP-SFWM. FIG. 2B shows the typical temporal correlation function $g^{(2)}(\tau)$ with pump powers P1=1 mW and P2=3 mW at the input 132 of the lattice 110. The measured maximum $g^{(2)}(0)$ of about 117 evidenced that the two photons were indeed correlated. Integration over the correlation peak was performed to assess the total number of coincidence counts in a given acquisition time (here 10 seconds). FIG. 2C illustrates the measured number of coincidence counts as a function of the frequency detunings $\delta\omega_{p1}$, $\delta\omega_{p2}$. It can be observed that the photon generation rate is at maximum when both of the pump frequencies are in the edge band 172 of the corresponding FSR (that is, when $\delta\omega_{p1}$, $\delta\omega_{p2}=[-1,1]$ J). Furthermore, compared to the bulk band regions 170, the generation rate was substantially uniform throughout the edge band 172. While a given choice of the two pump frequencies, energy and momentum conservation lead to spectral correlations between generated photons, the performed measurement of the number of generated photon pairs as a function of the pump frequencies did not necessarily resolve these spectral correlations.

To measure the spectral correlations $|\Gamma(\delta\omega_s, \delta\omega_i)|$ between generated signal and idler photons, the input pump frequencies were fixed to be in the middle of the edge band 172, at $\delta\omega_{p1} \approx \delta\omega_{p2} \approx 0$. (Here, $\delta\omega_s$, $\delta\omega_i$ are the frequency detunings of the signal or idler photons relative to their longitudinal mode resonances. The measured correlations showed that, with the two pump fields in the edge band, the spectrum of generated signal and idler photons were also limited to the edge band. This is because of the linear dispersion of the edge states that led to efficient phase matching (momentum conservation) when all the four fields were in the edge band, and also because of the confinement of the edge states to the lattice boundary that led to a good spatial overlap between the fields. Furthermore, both the signal and idler spectra were centered around $\delta\omega_s \approx 0 \approx \delta\omega_{p2}$, which indicated that these spectra were degenerate in frequency. Given the fact that the experimentally built ring resonator waveguides supported a single TE polarized mode and the generated photons were collected from a single spatial mode (the same output port), the generated photons were acknowledged to be indistinguishable in all degrees of freedom.

Figure 2D:
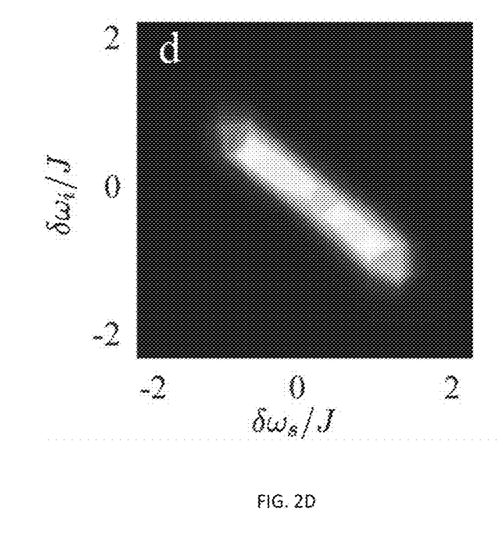
FIGS. 2D, 2E, and 2F illustrate measured joint spectral intensity of the signal/idler photons (of the generated photon pair) for input pump frequencies $(\delta\omega_{p1}, \delta\omega_{p2})=(0,0)$, (0.8, 0)J, and (0.8, 0.8)J, respectively. These pump frequencies are also indicated in FIG. 2C as d, e, and f respectively. The dashed lines in FIG. 2C show the spectra of generated photons in the edge band allowed by energy conservation.
Figure 2E:
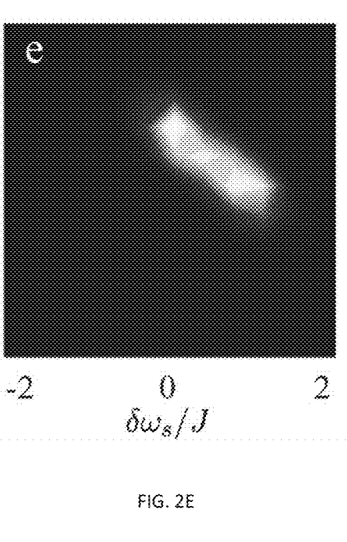
Figure 2F:
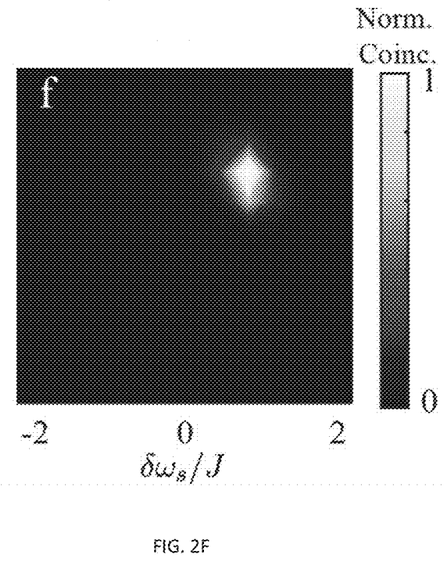

The skilled person will now appreciate that the energy conservation and the linear dispersion of the edge states also allows the user to tune the spectral bandwidth of generated photons by tuning the input pump frequencies within the edge band region. This possibility originates because of the efficient momentum conservation in the edge band that limits the spectra of generated photons also to the edge band region. To show such tunability of the spectra of generated photons, a measurement of the signal-idler spectral correlations for different pump frequencies in the edge band was performed. When both the pump frequencies are near the side of the edge band (~0.8 J), it was observed that the spectra of the generated photons were significantly narrower (by about 3×) than those in the situation when both pump light frequencies were in the center of the edge band (compare FIGS. 2D, 2E, 2F). Also, as expected, the spectra were centered around 0.81 Similarly, when the two pump frequencies were at different locations in the edge band ($\delta\omega_{p1} \approx 0.8$ J, $\delta\omega_{p2} \approx 0$) it was observed that the spectra of the generated photons were centered around 0.4 J, with a bandwidth wider than that in the situation when both pump frequencies were chosen at the side of the edge band.

While the above-discussed spectral measurements already suggested that the generated photons were indistinguishable, the Hong-Ou-Mandel (HOM) interference experiment (see Hong C. K. et al., in Phys. Rev. Lett., 59, 1987) could unambiguously confirm such indistinguishability of photons. As is well recognized in the art, in the HOM interference experiment two indistinguishable photons that arrive simultaneously at the two input ports of a beam-splitter bunch together at the output. However, in our embodiment 100 of the topological source of light, both of the photons at the output from the array 110 are in a single spatial mode, they are degenerate in frequency, and have the same polarization. Therefore, as required for the HOM interference experiment, such photons cannot be separated into two spatial modes using a conventional beam-splitter (which is probabilistic). Nevertheless, according to the idea of the invention, the two photons can be deterministically separated using the time-reversed HOM interference at a beamsplitter when the input is a path-entangled state of the form $|20\rangle_{A,B}+|20\rangle_{A,B}$ (that is, both of the photons from the pair arrive either at the port A or at the port B of the beamsplitter). Here the state $|mn\rangle_{A,B}$ refers to n photons in the first port of the beamsplitter and m photons in the second port.

Figure 3A:
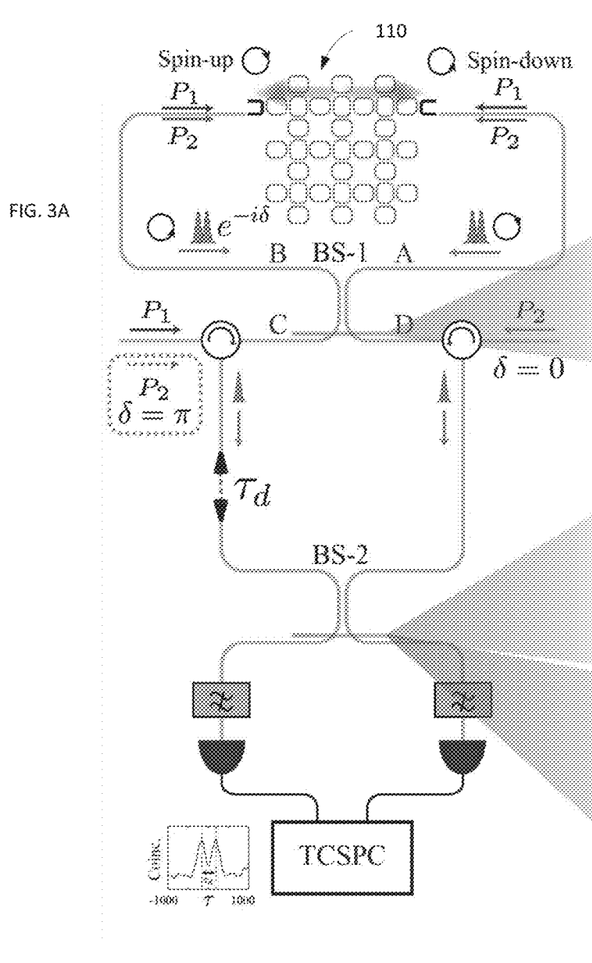
FIG. 3A: A schematic of the Sagnac interferometer setup used to deterministically split the two photons generated with the embodiment of FIG. 1A via time-reversed HOM interference of a path-entangled two-photon state (at beamsplitter BS1), and subsequently, realize HOM interference at beamsplitter BS2 with a variable delay τ between the two photons.
Figure 3B:
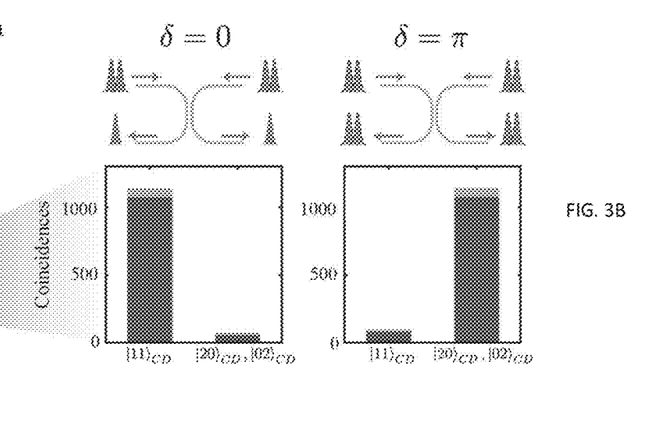
FIG. 3B: Bar plots and corresponding representing measured two-fold coincidences at the output ports C, D of the beamsplitter BS1, for two different configurations of the input pump beams. The photons anti-bunch (bunch) when the two pumps are in separate (same) input ports of BS1.

To implement this deterministic beamsplitter in practice, the array 110 of the topological source was used in a Sagnac interferometer setup (formed by beamsplitter BS-1, see FIG. 3A). In this configuration, both the pseudospins (up and down) associated with the source were simultaneously pumped. Because they are time-reversed partners, the pump beams corresponding to the two pseudospins propagated through the same edge state, but in opposite directions, and generated an entangled two-photon state $|20\rangle_{A,B}+e^{i\delta}|20\rangle_{A,B}$ at ports A,B of the beamsplitter BS-1. Notably, the strength of the SFWM interaction in such experiment was rather weak (and, therefore, the probability of generating two photon pairs, one in each arm of the Sagnac interferometer, was small). The relative phase $\delta$ of the two-photon entangled state could be set to 0 or $\pi$ by appropriately choosing the input ports for the two pump beams at the Sagnac beamsplitter (BS-1 in FIG. 3A). When light from both pump lasers are in the same port of the BS-1 (Port C or Port D), the relative phase is $\delta=\pi$, and the two photons bunch at the output of BS-1 (that is, the two photons appear at either port C or port D of BS-1. In contrast, when the two pumps are in different ports of the beamsplitter BS-1 (one in Port C, and the other in Port D), the relative phase is $\delta=0$, which leads to anti-bunching of photons such that the photons are deterministically separated at the output of the BS-1. See bar plots and diagrams of FIG. 3B. In the experiment, two circulators were used (FIG. 3A) to collect the photons at ports C and D. For $\delta=0$, the measured probability of anti-bunching was about 0.95, and for $\delta=\pi$, the total probability of bunching (in either port C or port D) was measured to be 0.93. A skilled person appreciates that the use of a Sagnac interferometer, with the two pump beams injected at different input ports, alleviates the need for any active stabilization of the topological source of light.

Figure 3C:
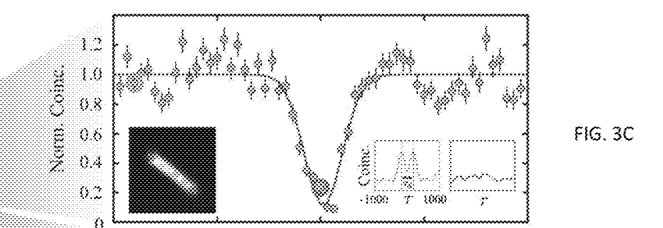
FIGS. 3C, 3D are plots representing measured HOM interference dip for anti-bunched photons with $\delta=0$, and the pump frequencies $(\delta\omega_{p1}; \delta\omega_{p2})=(0; 0)$ J, and $(0.8; 0.8)$J, respectively. Insets show the measured joint spectral intensity (JSI; the spectrum of the two photons).

To demonstrate the HOM interference, the relative phase was set to be $\delta=0$ such that the two photons were deterministically separated in the ports C and D of the beamsplitter BS-1. The array 110 was pumped at a frequency chosen to be in the middle of the edge band (that is $\delta\omega_{0p1} \approx \delta\omega_{p2}$). A relative delay $\tau$ was introduced between the two photons, to interfere the photons on another beamsplitter (BS-2), and to measure the coincidence counts at the output of BS-2 as a function of the delay $\tau$ between the photons. As expected, an HOM dip could be observed in the coincidence counts (see FIGS. 3C, 3D), with a visibility of 88 (10)%, which confirmed that the two photons were indeed indistinguishable.

Notably, the temporal width of the HOM interference dip is inversely related to the spectral width of the joint-spectral intensity (along the line $\delta\omega_s=\delta\omega_i$) that characterizes the two-photon state. As was shown in reference to FIGS. 2A-2F, the joint spectral intensity (JSI) of the photons generated in the embodiment of the source of FIG. 1A could be controlled by simply tuning the input pump frequencies.

Figure 3D:
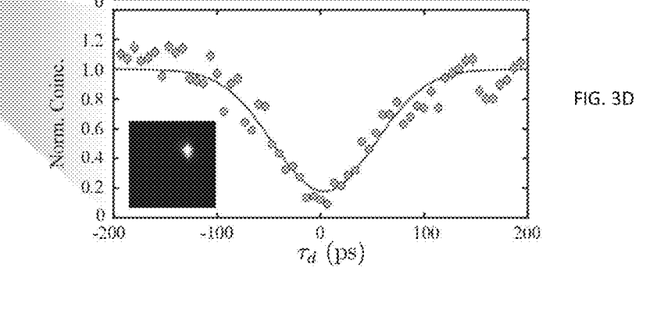

To demonstrate similar control in the HOM interference experiment, the two pump frequencies were set to be at one of the extremes of the edge band ($\delta\omega_{p1} \approx 0.8$ J $\delta\omega_{p2}$) such that the spectral width of the JSI was limited to approximately 0.8 J (FIG. 3E). It can be observed that the temporal width of the HOM interference dip is indeed much larger (by a factor of about 2.7(4)) as compared to the case with both pump frequencies were in the center of the edge band (FIG. 3D). The discrepancy between this factor and the decrease in the spectral width (by a factor of 4.0(6)) can be accounted for by the limited spectral resolution of the JSI measurement.

Figure 4A:
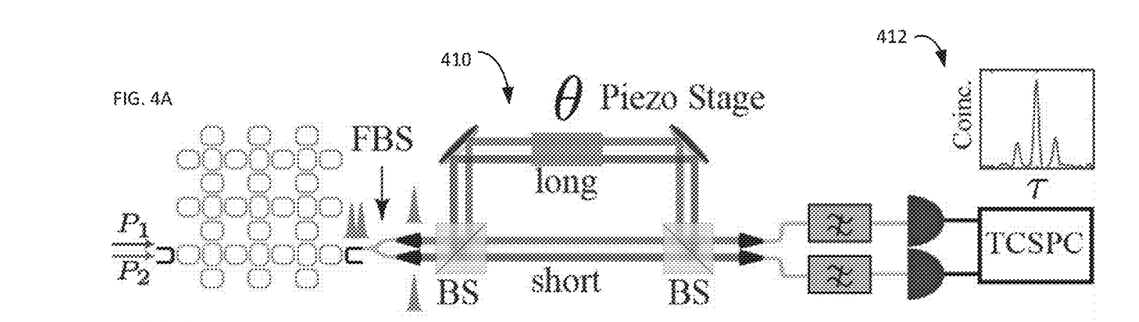
FIG. 4A is a schematic of the Franson interferometer setup used to demonstrate the energy-time entanglement of generated photon pairs generated with the embodiment of FIG. 1A. The delay between the short and the long paths is about 800 ps, much longer than the photon pulse widths.
Figure 4B:
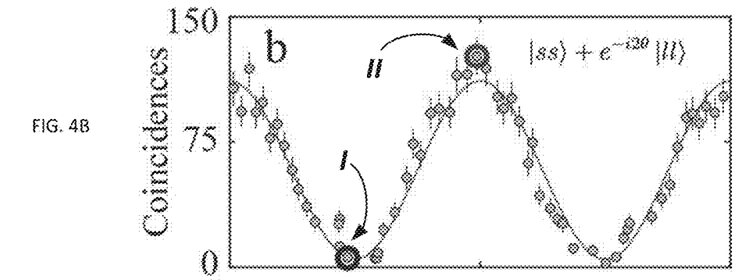
FIG. 4B is the plot representing measured two-fold coincidences in the central peak, (that is, when both the photons travel through the same path (short or long), as a function of the interferometer phase θ.
Figure 4C:
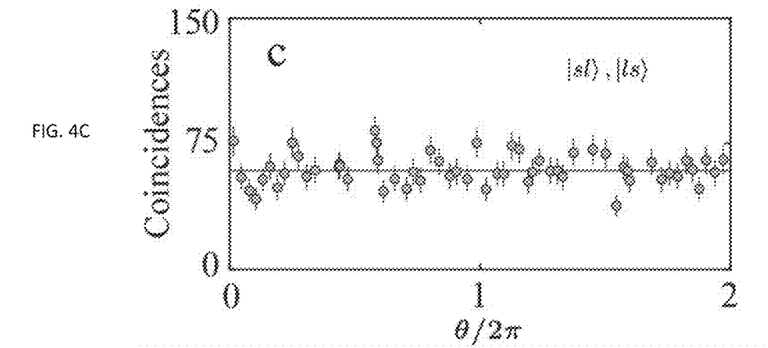
FIG. 4C is a plot depicting measured two-fold coincidences in the side peaks (that is, when the photons travel through different paths and are therefore, distinguishable).
Figure 4D:
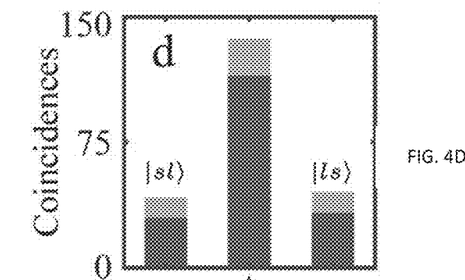
Figure 4E:
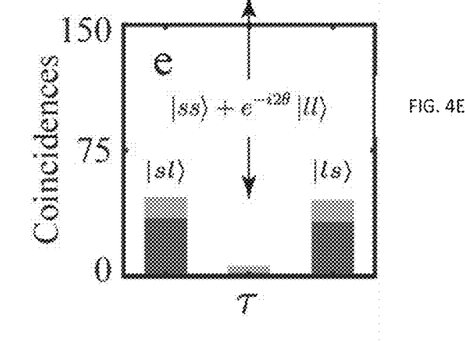

Finally, it was shown that the generated two-photon state was energy-time entangled. The use of a continuous-wave pump for generating photon pairs via SFWM (or SPDC) naturally led to the emergence of energy-time entanglement such that $\Delta\omega\Delta T<1$, where $\Delta\omega=\Delta(\omega_S+\omega_i)$ is the uncertainty in the total energy of the signal and idler photons, set by the pump bandwidth. $\Delta T$ is the uncertainty in the time interval between arrivals of the two photons (see Franson 1989). Here, a beam splitter was used to probabilistically split the two photons at the output of the used topological source, and to inject these photons into paired Franson interferometers (410, FIG. 4A) with a path-length delay of about 800 ps that was much larger than the temporal correlation of the generated photons ($\Delta T \approx 200$ ps, as shown in FIG. 2B). Time-resolved coincidence measurements at the outputs of the interferometers showed three peaks (see 412, FIG. 4A).

The two side peaks correspond to the two cases when one of the photons took a shorter path in the interferometer 410, and the other took a longer path. The center peak corresponds to the two cases when both photons took either the shorter path (|ss⟩) or the longer path (|11⟩). In reference to FIGS. 4B, 4C, 4D, and 4E, we measured the number of coincidence counts in the three peaks 412 as the phase θ of the interferometers 410 was varied. The latter two cases (both short or both long) were indistinguishable, and therefore, we observed interference fringes in the coincidence counts as a function of the two-photon phase 2θ acquired in the interferometer 412. In contrast, the other two cases (where one photon travels through the shorter path and the other through the longer path of the interferometer (|sl⟩, |ls⟩)) are distinguishable from one another and, accordingly, yielded no interference. The observation of the two-photon interference fringes (for a path-length delay that is much longer than the temporal correlation width $\Delta T$ of the photons) demonstrated that the coherence time of the generated two-photon state ($1/\Delta\omega$) was much longer than $\Delta T$, and that the two-photon state was indeed energy-time entangled. A related embodiment of the topological source that utilizes pulsed laser pumps with broad-band spectra can also be used to generate indistinguishable photons pairs that are also nearly separable and can, therefore, enable multi-photon interference schemes.

It has been already demonstrated in related art with the use of a single-pump SFWM process in topological devices (see Mittal 2018) that the spectral correlations between the pump and the generated distinguishable photon pairs were robust against fabrication disorders. The dual-pump SFWM process used in the embodiment of the present invention, to generate indistinguishable photon pairs, is, therefore, expected to possess similar robustness. To demonstrate the robustness of the spectral correlations with the use of the source 100 in the presence of disorder—and in reference to FIG. 5 appropriate numerical simulations were performed.

Figure 5:
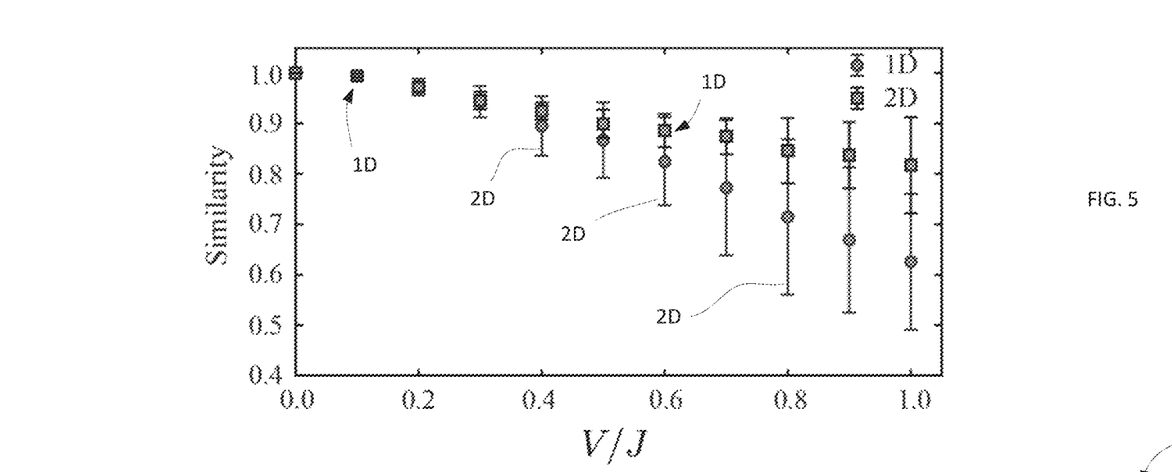
FIG. 5 presents numerical simulation results comparing the similarity in the spectra of generated photons as a function of disorder strength for a topologically trivial 1D array and 2D topological devices. The spectra of generated photons in the topologically trivial 1D devices are much more susceptible to disorder as compared to those of the 2D topological devices.

Specifically, to prove the robustness of spectral correlations of the embodiment 100 of the source of quantum light in the presence of structural disorder, numerical simulations were performed to calculate the spectra of generated photons in the presence of random disorder. The disorder was introduced using random variations in the ring resonator frequencies, where the disorder strength is given by V. The input pump frequencies were fixed in the center of the edge band—as $(\omega_{p1}, \omega_{p2})=(0,0)$ J—and the results were averaged over 100 random realizations for each disorder strength. The mean similarity of the disordered spectra with the spectra in the absence of any disorder was then calculated. The similarity ($S_{i,j}$) between two devices i and j is calculated by taking the mean of the inner product between two spectra and is given by, $$S_{i,j} = \frac{\sqrt{\int \Gamma_i \Gamma_j}^2}{\int \Gamma_i \int \Gamma_j}$$

where $\Gamma_{i,j}$ is the spectra of generated photons for a device i, j. The results were compared against those obtained for a topologically trivial 1D array of 10 ring resonators. Evidently, topological source of indistinguishable photon pairs achieves much higher spectral similarity across devices when compared to a topologically trivial source. It is also observed that the variability in the spectra of 1D devices is much higher compared to 2D devices for larger disorders. These results show the advantage of using topologically robust edge states for generating indistinguishable correlated photon pairs. In particular, pairs of generated photons that are correlated in intensity, spectrum and time, and are indistinguishable with respect to each and every degrees of freedom.

As expected, it was observed that the topological source of indistinguishable photon pairs used in an embodiment of the present invention achieved much higher spectral similarity across devices when compared to a topologically trivial source.

Overall, a person of ordinary skill in the art having the advantage of this disclosure, will readily appreciate that embodiments of the invention provide a topological source of indistinguishable, energy-time entangled photon pairs with tunable and robust spectral-temporal correlations. Such a source can be employed in an on-chip generation of novel quantum states of light (where topological phenomena are used for robust manipulations of the photonic mode structure and the quantum correlations between photons). In particular, in the low-loss regime, an embodiment of the topological device of the present invention can be used to achieve pair-generation rates that are an order of magnitude higher than that in single-ring sources. Such an embodiment can also be used to generate spectrally-engineered or spectrally-multiplexed squeezed light for applications in continuous-variable photonic quantum computation. On a more fundamental level, nonlinear parametric processes such as four-wave mixing are inherently non-Hermitian in nature (when treating the pump beam classically), that is, they do not conserve particle number. Therefore, the proposed system may be employed in investigations of the rich interplay between topology, non-Hermitian physics, and quantum photonics processes to realize novel topological phases that are unique to photons.

The contents of any publications referenced in this disclosure is incorporated by reference herein.

For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. In one specific case, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value. As a non-limiting example, two values being "substantially equal" to one another implies that the difference between the two values may be within the range of +/−20% of the value itself, preferably within the +/−10% range of the value itself, more preferably within the range of +/−5% of the value itself, and even more preferably within the range of +/−2% or less of the value itself.

The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes.

Figure 6:
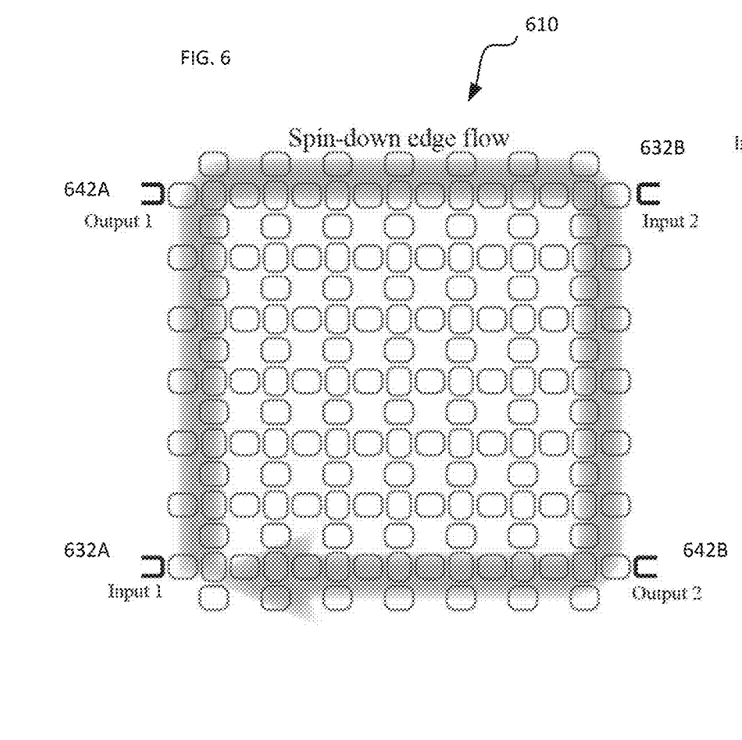
FIGS. 6 and 7 schematically illustrate related embodiments of a multidimensional array of ring resonators for use with an embodiment of the source of quantum light of the invention.
Figure 7:
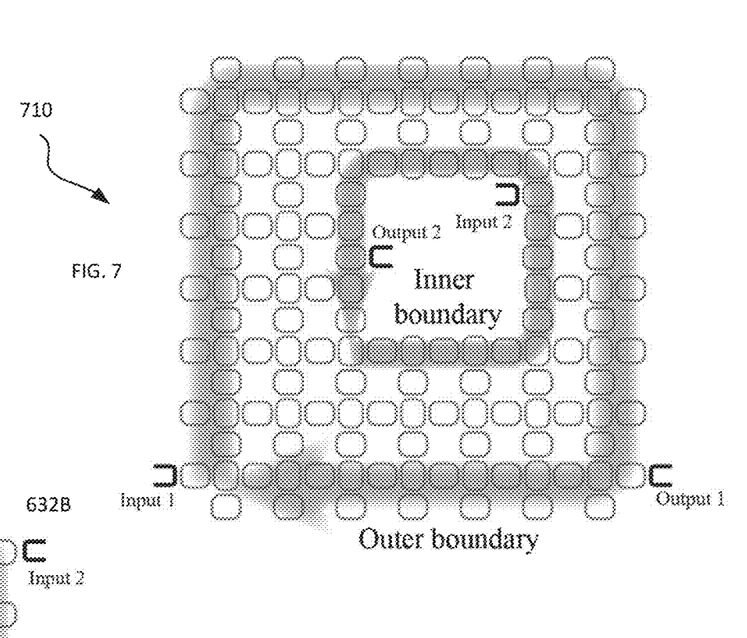

While the invention is described through the above-described examples of embodiments, it will be understood by those of ordinary skill in the art that modifications to, and variations of, the illustrated embodiments may be made without departing from the inventive concepts disclosed herein. For example, and in reference to FIG. 6, the multi-dimensional array 610 of a related non-limiting embodiment of the invention can be configured to include multiple input ports (632A, 632B) and/or multiple output ports (642A, 642B), as shown—two of each. Similar configuration is reflected in the embodiment 710 of the array of FIG. 7, which—additionally or in the alternative is shaped or structured to be spatially irregular. In the specific example of FIG. 7, the array 710 is dimensioned to have an outer peripheral region (by analogy with the array 110 of FIG. 1A) and an inner peripheral region, as shown, each of which supports the propagation of light in a corresponding edge state when the frequency of the pump light delivered to such array 710 from the corresponding pump laser system (not shown) falls within the appropriate edge band(s) of the transmission spectrum/a of such array 710. Generally, the irregularly-shaped array of ring resonators can be dimensioned—in the case of a 2D array, for example—to have a generally convex shape, a concave shape, a rectangular shape, a shape of an annulus, or another irregular shape. Accordingly, an embodiment of an array of ring resonators can be structured to have one or more of outer peripheral regions and/or one or more of inner peripheral regions as defined in this disclosure.

Figure 8:
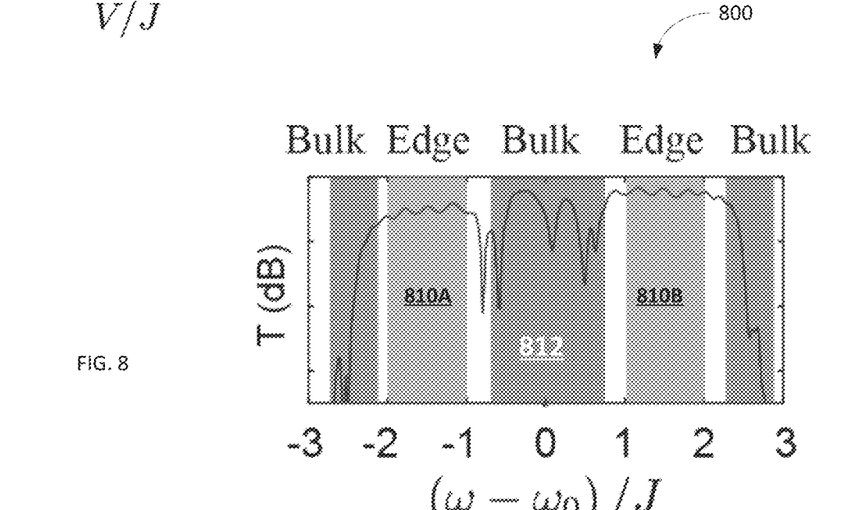
FIG. 8 illustrates the transmission spectrum of a related embodiment of the invention.

In another non-limiting related embodiment, FIG. 8 illustrates a simulated transmission spectrum 800 of a device characterized by multiple (as shown—two) transmission edge bands 810A, 810B formed with the use of the integer quantum Hall model where the next-nearest neighbour couplings are absent and the hopping phase $\phi=y\pi/2$, with y being the vertical site ring index of the corresponding array of ring resonators. In this case, as can be seen, the multiple transmission bulk bands include band 812 that is sandwiched not only between the transmission edge bands 810A, 810B but also between the outlying bulk bands of the spectrum 800.

Disclosed aspects, or portions of these aspects, may be combined in ways not listed above. Accordingly, the invention should not be viewed as being limited to the disclosed embodiment(s). The invention as recited in claims appended to this disclosure is intended to be assessed in light of the disclosure as a whole. Various changes in the details, steps and components that have been described may be made by those skilled in the art within the principles and scope of the invention.

The invention claimed is:

1. A source of quantum light comprising:
a multidimensional array of ring resonators including a multiplicity of site ring resonators and link ring resonators, at least one input port and at least one output port,
wherein, in each column and each row of the array, the site ring resonators and the link ring resonators alternate with one another,
wherein the array of ring resonators has a multi-free spectral range (FSR) transmission spectrum that, in each of multiple FSRs, includes (i) at least one transmission edge band that is substantially spectrally uniform and characterized by a substantially linear dispersion and (ii) first and second transmission bulk bands sandwiching the at least one transmission edge band;
and
an optical pump system including first and second lasers optically coupled into the at least one input port,
wherein the source of quantum light is configured to produce, at the at least one output port, a light output that is spectrally tunable within the at least one transmission edge band and that contains a pair of indistinguishable correlated photons.

2. The source of quantum light according to claim 1, wherein the array is dimensioned to have an irregular shape.

3. The source of quantum light according to claim 2, wherein each of the multiple FSRs contains multiple transmission edge bands.

4. The source of quantum light according to claim 1, wherein a first resonant frequency of the site ring resonators is different from a second resonant frequency of the link ring resonators.

5. The source of quantum light according to claim 1, wherein an optical length of each of the link ring resonators is different from an optical length of each of the site ring resonators by substantially an odd multiple of one half of an operating wavelength.

6. The source of quantum light according to claim 1, wherein each link ring resonator is dimensioned to transmit light, from a first of said site ring resonators to a second of said site ring resonators while introducing a phase change to the light, wherein a value of said phase change depends on a direction of propagation of light through the array, wherein the first and second site ring resonators are sandwiching said link ring resonator.

7. The source of quantum light according to claim 1,
wherein the array includes a peripheral region of the array circumscribing a central region of the array,
wherein the peripheral region is configured as a closed-loop waveguide formed by the site ring resonators and the link ring resonators disposed at least in first and last columns of the array and at least in first and last rows of the array, and
wherein the source of quantum light is configured to maintain propagation of light only along the peripheral region when a spectral frequency of said light is within the transmission edge band.

8. The source of quantum light according to claim 7, wherein, in operation of the source of quantum light, the central region of the array is substantially devoid of light having the spectral frequency within the at least one transmission edge band.

9. The source of quantum light according to claim 1, configured such that light, propagating through the array to form said light output, includes first and second counter-propagating edge modes of light when a frequency of said light is within the at least one transmission edge band.

10. The source of quantum light according to claim 9, wherein the at least one input port includes first and second input ports, and is configured such that either the first or the second counter-propagating edge mode is selected for propagation based on whether pump light from the first and second lasers is coupled into the first input port or the second input port.

11. The source of qauntum light according to claim 1,
wherein the array includes a peripheral region of the array circumscribing a central region of the array,
wherein the peripheral region is configured as a closed-loop waveguide formed by the site ring resonators and the link ring resonators disposed at least in first and last columns of the array and at least in first and last rows of the array,
wherein the source of light is configured such that light, propagating in operation through the array to form said light output, includes first and second counter-propagating edge modes of light when a frequency of said light is within the at least one transmission edge band, and
wherein the first and second counter-propagating edge modes are substantially confined within the peripheral region of the array.

12. A method comprising:
receiving, at at least one input port of a multidimensional array of ring resonators, pump light from first and second laser pump systems,
wherein said array includes a multiplicity of site ring resonators and link ring resonators, said at least one input port, and at least one output port,
wherein, in each column and each row of the array, the site ring and link ring resonators alternate with one another,
wherein the array has a multi-free spectral range (FSR) transmission spectrum that, in each of multiple FSRs, includes at least one transmission edge band that is substantially spectrally uniform and first and second side transmission bulk bands sandwiching said at least one transmission edge band;
and
producing, at the at least one output port, a light output by at least circulating light energy of the pump light around a peripheral region of the array,
wherein said light output is spectrally-tunable within the at least one transmission edge band and wherein said light output contains a pair of indistinguishable correlated photons.

13. The method according to claim 12,
wherein the array includes said peripheral region of the array and a central region of the array circumscribed by the peripheral region,
wherein the peripheral region is configured as a closed-loop waveguide formed by the site ring resonators and the link ring resonators disposed at least in first and last columns of the array and at least in first and last rows of the array, and
wherein said circulating includes maintaining a propagation of said light energy along the peripheral region only when a spectral frequency of said pump light is within the at least one transmission edge band.

14. The method according to claim 13, wherein said maintaining does not include propagating of the pump light through the central region when the spectral frequency of the pump light is within the at least one transmission edge band.

15. The method according to claim 13, further comprising:
changing a phase of light propagating through the array when transmitting said light from a chosen site ring resonator through a neighboring link ring resonator to an adjoining site ring resonator, wherein a value of a change of the phase of light depends on a direction of propagation of the light through the array.

16. The method according to claim 12, wherein said circulating includes circulating said light energy from the pump light through a sequence of ring resonators having different optical lengths.

17. The method according to claim 12, wherein said producing includes transforming light by using a third order nonlinear process.

18. The method according to claim 12, further comprising increasing an intensity of said pair of indistinguishable correlated photons by substantially matching a frequency of pump light from the first laser pump system to a frequency of pump light from the second laser pump system.

19. The method according to claim 12, wherein said producing includes forming the pair of indistinguishable correlated photons that are energy-time entangled.

20. The method according to claim 12, wherein said producing includes forming the pair of indistinguishable correlated photons having a spectrum that is robust against a defect or variation in at least one of a resonant frequency of a chosen ring resonator and a position of said chosen ring resonator in the array.

* * * * *